No. 661,365. Patented Nov. 6, 1900.
T. F. BYRNE.
MACHINE FOR THREADING TAPE INTO EDGINGS.
(Application filed Apr. 24, 1900.)
(No Model.)
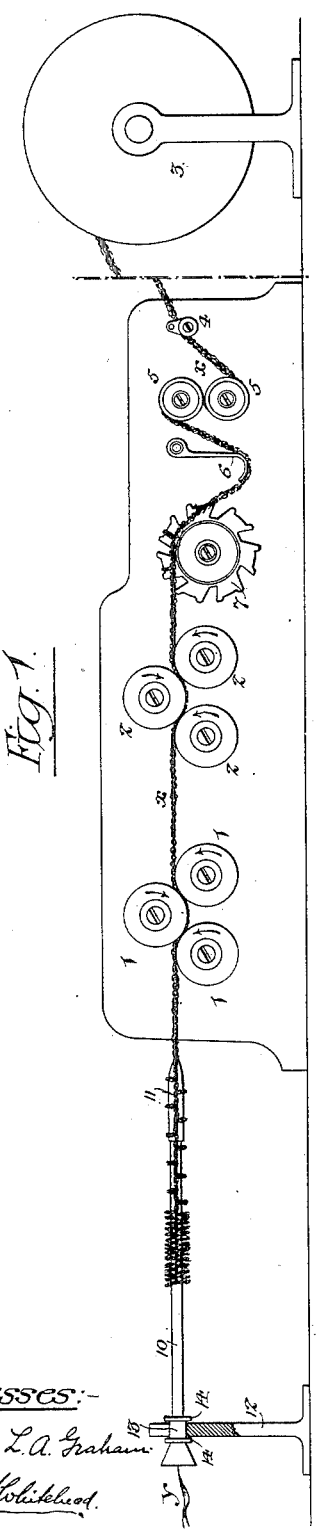
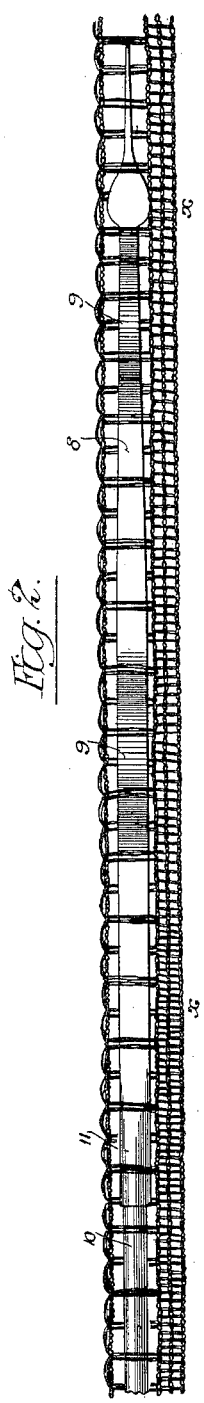
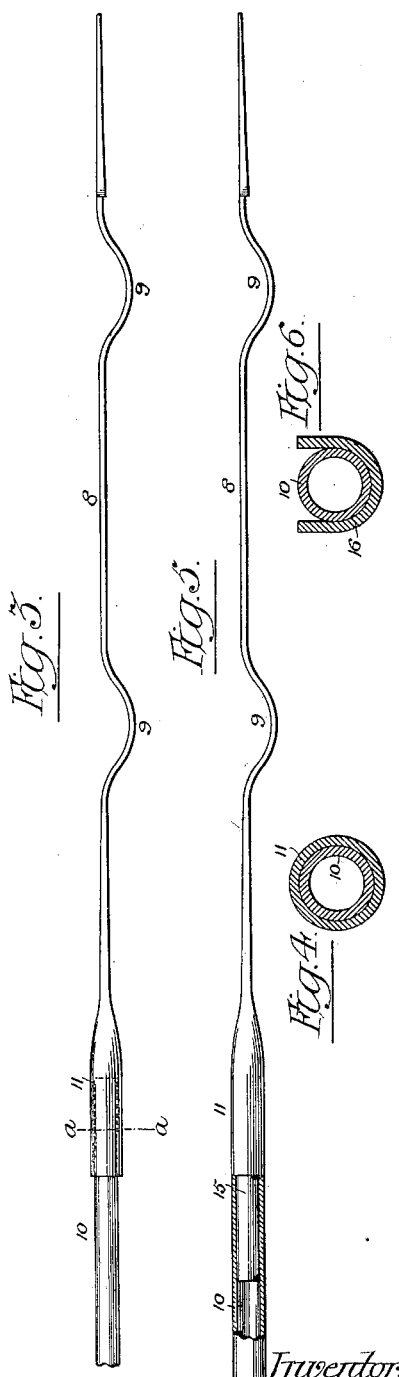
Witnesses:
Frank L. A. Graham
Louis W. Whitehead
Inventor:
Thomas F. Byrne
by his Attorneys
Howson & Howson

UNITED STATES PATENT OFFICE.

THOMAS F. BYRNE, OF PHŒNIXVILLE, PENNSYLVANIA.

MACHINE FOR THREADING TAPE INTO EDGINGS.

SPECIFICATION forming part of Letters Patent No. 661,365, dated November 6, 1900.

Application filed April 24, 1900. Serial No. 14,170. (No model.)

*To all whom it may concern:*

Be it known that I, THOMAS F. BYRNE, a citizen of the United States, and a resident of Phœnixville, Chester county, Pennsylvania, have invented certain Improvements in Machines for Inserting Tape into Lace Edgings, of which the following is a specification.

My invention relates to machines such as are employed for the purpose of inserting tape in lace edgings; and it consists in novel means for uniting the needle over which the lace edging is threaded to the tube which receives the lace edging from said needle and through which the tape is drawn, the object of my invention being to provide a simpler, more convenient, and more durable form of connection between the needle and tube than that which is now employed. This object I attain in the manner hereinafter set forth, reference being had to the accompanying drawings, in which—

Figure 1 is a side elevation of sufficient of the machine to which my invention relates to permit of an understanding of the operation of said machine and also to illustrate my invention. Fig. 2 is a plan view of the needle and part of the tape-tube with a strip of edging threaded thereon. Fig. 3 is a side view of the needle and part of the tape-tube. Fig. 4 is an enlarged transverse section on the line *a a*, Fig. 3. Fig. 5 is a view similar to Fig. 3, but illustrating a modification of the invention; and Fig. 6 is a view similar to Fig. 4, but illustrating another modification of my invention.

In the machine shown in Fig. 1 there are two sets of rollers, each composed of three rollers 1 1 1 or 2 2 2, set triangularly and intended to be rotated in the direction of their respective arrows, so as to draw forward from a spool or reel 3 a strip of lace edging *x*, into which the tape is to be inserted, said strip of edging passing first over a guide-roller 4, thence around tension-rollers 5, thence under a deflecting-plate 6, and thence around a ribbed or toothed roller 7, whereby the cross-bars of the edging are separated so as to permit of the ready entrance between them of the point of the needle 8, which has bent portions 9, whereby it conforms to and is held in longitudinal position by the rollers 1 and 2. Hence as said rollers are rotated the strip of edging *x* will be drawn rearwardly over the needle, the cross-bars of the edging passing alternately above and below the needle, so that the edging will be threaded upon the same. At its rear end the needle 8 is connected to a tube 10, onto which the edging is delivered by the needle and upon which the edging is crowded until it will hold no more. Through the tube 10 passes the tape *y*, which is to be inserted in the edging, and when the tube has been filled with edging it is disconnected from the needle 8, the edging is severed at the front end of the tube, and the edging and tape are then drawn longitudinally from the tube in a direction the reverse of that in which the edging was applied to the tube, so that as the edging is withdrawn the tape will be drawn out with it, and will consequently pass alternately under and over the cross-bars of the edging. A machine of this character is now in use; but the connection between the needle and the tape-tube is objectionable, being a hook construction which necessitates weakening of the needle, and, further, requires the bringing of the tube at right angles to the needle in order to engage the hooks, an operation which is rendered inconvenient by the fact that the tape-tube is often six feet or more in length in order that it may accommodate a large amount of edging before necessitating the stoppage of the machine.

In order to overcome this objection, I form the rear end of the needle with a tubular enlargement 11, into which the front end of the tape-tube 10 can enter, the outer end of the tube being supported in any suitable manner—for instance, by the slotted upper end of a bracket 12, which also preferably confines the tube 10 in position longitudinally, a collar 13 on the tube entering the slot of the bracket and having flanges 14 bearing upon opposite sides of said bracket, so as to constitute an effective means for such longitudinal confinement. When, therefore, the tape-tube has been filled with edging, it is disconnected from the needle by simply raising the outer end of the tube until it is free from engagement with the bracket and then withdrawing the tube longitudinally until its front end is removed from the tubular rear end of the needle, whereupon the edging can be severed and that portion of the edging which has been threaded upon the tube can be withdrawn therefrom with the tape. The reapplication of the tape-tube to the needle is effected by a reversal of these operations. Not only is the connecting and disconnecting of the needle and tape-tube thus rendered much more convenient than usual, but there is no weakening of either the tube or needle in order to produce the elements of the joint. Hence the breaking of the needles at the joint, which is a serious objection to the old form of fastening, is prevented.

In carrying out my invention I may provide the enlarged end of the needle with a stem 15, adapted to enter the front end of the tube 10, as shown in Fig. 5, instead of adopting the reverse construction, (shown in Fig. 3,) the enlarged portion of the needle and its projecting stem in this case being either solid or hollow, as desired; but this construction is open to the objection that there is a possibility of the edging catching upon the front end of the tape-tube unless the latter is at all times pressed tightly against the enlarged end of the needle. Hence I prefer the construction shown in Fig. 3, which is not open to the objection. Instead, however, of making the enlarged rear end of the needle 8 tubular, as shown in Figs. 3 and 4, I may construct that portion of the same which receives the forward end of the tube 10 as a hollow trough, into which the forward end of the tube can be entered laterally or vertically instead of longitudinally, such modification being illustrated at 16 in Fig. 6.

Having thus described my invention, I claim and desire to secure by Letters Patent—

1. The combination in a machine for inserting tape into lace edgings, of the tape-tube open at both ends and carrying the tape within it, the threading-needle, and rollers for feeding the edging over the needle and onto the tube, said needle having an enlarged rear end for the reception of the forward end of the tube, substantially as specified.

2. The combination in a machine for inserting tape into lace edgings, of the tape-tube open at both ends and carrying the tape within it, the threading-needle and rollers for feeding the edging over the needle and onto the tube, said needle having an enlarged rear end with projecting hollow portion for the reception of the front end of the tube, substantially as specified.

3. The combination in a machine for inserting tape into lace edgings, of the tape-tube open at both ends and carrying the tape within it, the threading-needle and rollers for feeding the edging over the needle and onto the tube, said needle having an enlarged rear end with which the front end of the tape-tube can be engaged by a longitudinal movement, and means for retaining said tape-tube longitudinally, substantially as specified.

4. The combination in a machine for inserting tape into lace edgings, of the tape-tube and threading-needle, said needle having an enlarged end for engagement with the front end of the tape-tube, and said tube having a flanged collar, and a slotted bracket or standard engaging with said collar, whereby it serves to support the tube vertically and confine it longitudinally, substantially as specified.

In testimony whereof I have signed my name to this specification in the presence of two subscribing witnesses.

THOS. F. BYRNE.

Witnesses:
WILLIAM H. PARSONS,
FRANCIS H. I. BANKS.